United States Patent
Tohyama et al.

[11] Patent Number: 6,108,481
[45] Date of Patent: Aug. 22, 2000

[54] OPTICAL SEMICONDUCTOR DEVICE AND ITS MANUFACTURING METHOD

[75] Inventors: Masaki Tohyama; Masahisa Funemizu; Yuzo Hirayama, all of Yokohama, Japan

[73] Assignee: Kabushiki Kaisha Toshiba, Kawasaki, Japan

[21] Appl. No.: 09/016,411

[22] Filed: Jan. 30, 1998

[30] Foreign Application Priority Data

Jan. 31, 1997 [JP] Japan .................................. 9-018765

[51] Int. Cl.⁷ .................................................. G02B 6/122
[52] U.S. Cl. .............................. 385/131; 385/50; 438/31; 438/39; 438/42
[58] Field of Search .................................. 385/49, 50, 88, 385/89, 129–132; 372/43–50; 438/31, 39, 40, 42, 43

[56] References Cited

U.S. PATENT DOCUMENTS

| | | | |
|---|---|---|---|
| 4,946,242 | 8/1990 | Tanno et al. | 385/88 |
| 4,964,135 | 10/1990 | Mitsui et al. | 372/46 |
| 5,573,976 | 11/1996 | Kato et al. | 438/42 |
| 5,608,750 | 3/1997 | Nakatsuka et al. | 372/45 |

OTHER PUBLICATIONS

Masahiro Aoki, et al., OFC '95 Technical Digest, Paper TuF5, pp. 25 & 26, 1995, "High–Performance Modulator/Integrated Light Sources Grown by an In–Plane Band–Gap Energy–Control Technique".

*Primary Examiner*—John D. Lee
*Attorney, Agent, or Firm*—Oblon, Spivak, McClelland, Maier & Neustadt, P.C.

[57] ABSTRACT

In order to realize an optical semiconductor device having a window structure promising high-speed operation and highly efficient coupling with optical fibers and to realize its manufacturing method, the device has a window structure in which an optical guide layer is partly removed near the emission facet to decrease the facet reflectivity. Since a cladding layer has a narrow mesa structure also in a window region, the parasitic capacitance can be reduced, and high-speed modulation is ensured. Although light runs through the window region in spread directions from one end of the optical guide layer toward the emission facet, the cladding layer changes its width or thickness in accordance with the spread angle of light. Therefore, light is not reflected or scattered by side surfaces of the cladding layer, and prevents a decrease in optical output due to a scattering loss, or a deterioration in distribution of emitted light. As a result, the device has a high coupling efficiency with optical fibers, and is operative for high optical output.

12 Claims, 15 Drawing Sheets

OPTICAL SEMICONDUCTOR DEVICE AND ITS MANUFACTURING METHOD

BACKGROUND OF THE INVENTION

1. Field of the Invention

This invention relates to an optical semiconductor device, in particular, operative for high-speed modulation in response to an electric signal.

2. Description of the Prior Art

Research and develpment toward the realization of large capacities of trunk optical transmission systems are intensively being done. Also, under the current condition where optical fiber amplifiers have removed restriction on transmission distances caused by the optical loss of optical fibers, extension of transmission distance using an external modulation method with small wavelength chirping is desired. In particular, semiconductor optical modulators, which have small wavelength chirping even upon high-speed modulation and can be monolithically integrated with a semiconductor laser as a light source, are expected to be key devices supporting next-generation trunk optical transmission systems.

When a semiconductor optical modulator and a semiconductor laser are monolithically integrated, if there is any reflection at a facet of the optical modulator, reflected return light running into the laser region will results in inducing wavelength chirping. Therefore, the reflectivity of the emission facet of the modulator must be very small in a modulator/laser integrated light source. For example, the reflectivity of the facet must be as low as 0.01% or less, approximately, to ensure transmission of an optical signal at the rate of 2.5 Gbps over 500 km. For this purpose, mere coating of the emitting facet with a low reflective film is insufficient, and the use of a window-structure is indispensable.

FIG. 21 is a perspective view of the part of the emission facet of a conventional modulator/laser integrated light source combining a electro-absorption semiconductor optical modulator and a distributed feedback semiconductor laser. Numeral 1 refers to an n-type InP substrate, 2 to a light absorption layer, 3 to a Fe-doped semi-insulating InP buried layer, 4 to a p-type InP cladding layer, 5 to a p-type InGaAs contact layer, 6 to a p-type ohmic electrode made of Au/Zn/Au, 7 to a wiring and bonding pad made of Ti/Pt/Au, 8 to an n-type ohmic electrode made of AuGe/Ni/Au, 9 to a $SiO_2$ film, and 10 to a low-reflective coating film of $SiN_x$. In order to decrease the reflectivity of the emission facet, the light absorption layer 2 is partly removed near the emission facet to form a window region 15. Moreover, since high-speed modulation is not expected unless the capacitance of parasitic elements is low, a narrow mesa structure is used in the modulator region 16 and the window region 15.

In general, it is desirable that light output from a light source integrating an optical modulator and a semiconductor laser has an unimodal intensity distribution as far as possible to ensure a coupling efficiency with optical fibers.

FIG. 22 is a schematic explanatory diagram illustrating the light emitting from the light absorption layer of a conventional optical modulator/semiconductor laser integrated light source. In the modulator region 16, light propagates along the light absorption layer 2 also serving as a wave guide. In the window region 15 not having a guide structure, light is emitted in spread-out directions, and reflected or scattered by the side surface of the narrow mesa 14. A loss by scattering results in a decrease of optical output, and interference of reflected light largely distorts the intensity distribution of the emitted light. Therefore, the coupling efficiency of the conventional device with optical fibers was as low as 25%, and high-output devices could not be expected.

That is, if both a narrow-mesa structure and a window structure are used in conventional optical modulator/semiconductor laser integrated light sources, then an increase in loss in the window region and a decrease in coupling efficiency with optical fibers prevent an increase in optical output.

SUMMARY OF THE INVENTION

It is therefore an object of the invention to provide an optical semiconductor device having a window structure promising both a high-speed modulation and a high coupling efficiency with optical fibers.

Another object of the invention is to provide a method for fabricating such an optical semiconductor device.

The central concept of the invention is to change the width or the thickness of the cladding layer in accordance with the spread-out angle of light, in the window region made by partly removing the optical guide layer, to realize both a high-speed modulation and a high-output of the device.

According to the invention, there is provided an optical semiconductor device having a narrow mesa structure made of a stripe-shaped guide layer and a cladding layer overlying the guide layer, characterized in that the guide layer is partly removed near an emission edge, and the cladding layer varies in width or thickness near the emission edge in accordance with the angle of dispersion of light irradiated emitted from an end portion of the guide layer toward the emission edge.

In a preferable version of the invention, the width or thickness of the cladding layer near the emission edge changes in a tapered configuration or in a stepped configuration.

The optical semiconductor device may have a cutout in a region other than the cladding layer in the narrow mesa structure. It may be fabricated by the step of forming a stripe-shaped optical guide layer intermittently extending in the waveguide direction on a semiconductor substrate, the step of embedding the optical guide layer by the cladding layer, the step of shaping the cladding layer into the form of a narrow mesa containing the optical guide layer, the step of forming a V-shaped groove extending in a direction normal to the optical guide layer in a region except for the narrow mesa-shaped cladding layer, and the step of cleaving the product by applying a stress onto the V-shaped groove, in which the bottom of the V-shaped groove is located in the interrupted region of the optical guide layer, and the cladding layer increases its width or thickness in accordance with the spread angle of light from the end of the optical guide layer toward the bottom of the V-shaped groove.

The optical semiconductor device may be integrated together with another optical semiconductor device on a common semiconductor substrate.

These constructions according to the invention ensures that, while using the narrow-mesa structure for decreasing the parasitic capacitance and the window structure for reducing the facet reflectivity, the device has no scattering loss and promises a distribution of emitted light suitable for coupling with optical fibers. Therefore, the invention can realize an optical semiconductor device operative for both a high-speed modulation and a high-output, and can provide a light source with a smaller wavelength chirp, which contributes to realization of a large-capacity and long-distance trunk optical transmission system.

DETAILED DESCRIPTION OF THE PREFERRED EMBODIMENTS

Explained below are embodiments of the invention with reference to the drawings.

(First Embodiment)

Figure 1:
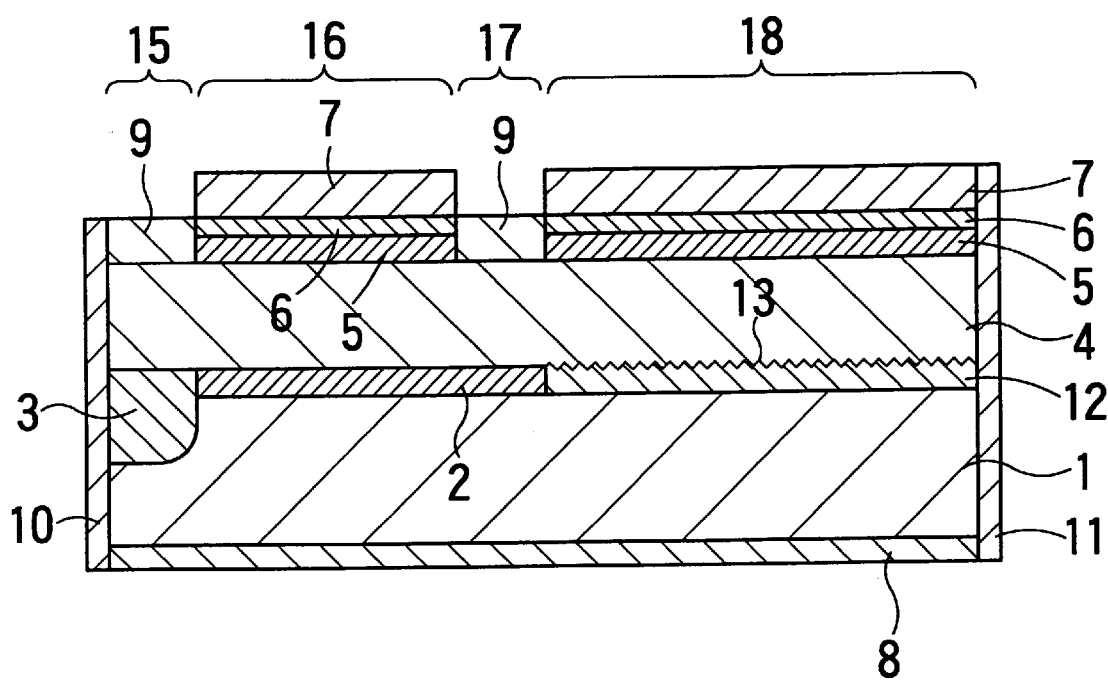
FIG. 1 is a cross-sectional view of an optical semiconductor device according to the first embodiment of the invention, taken along the optical guiding direction.
Figure 2:
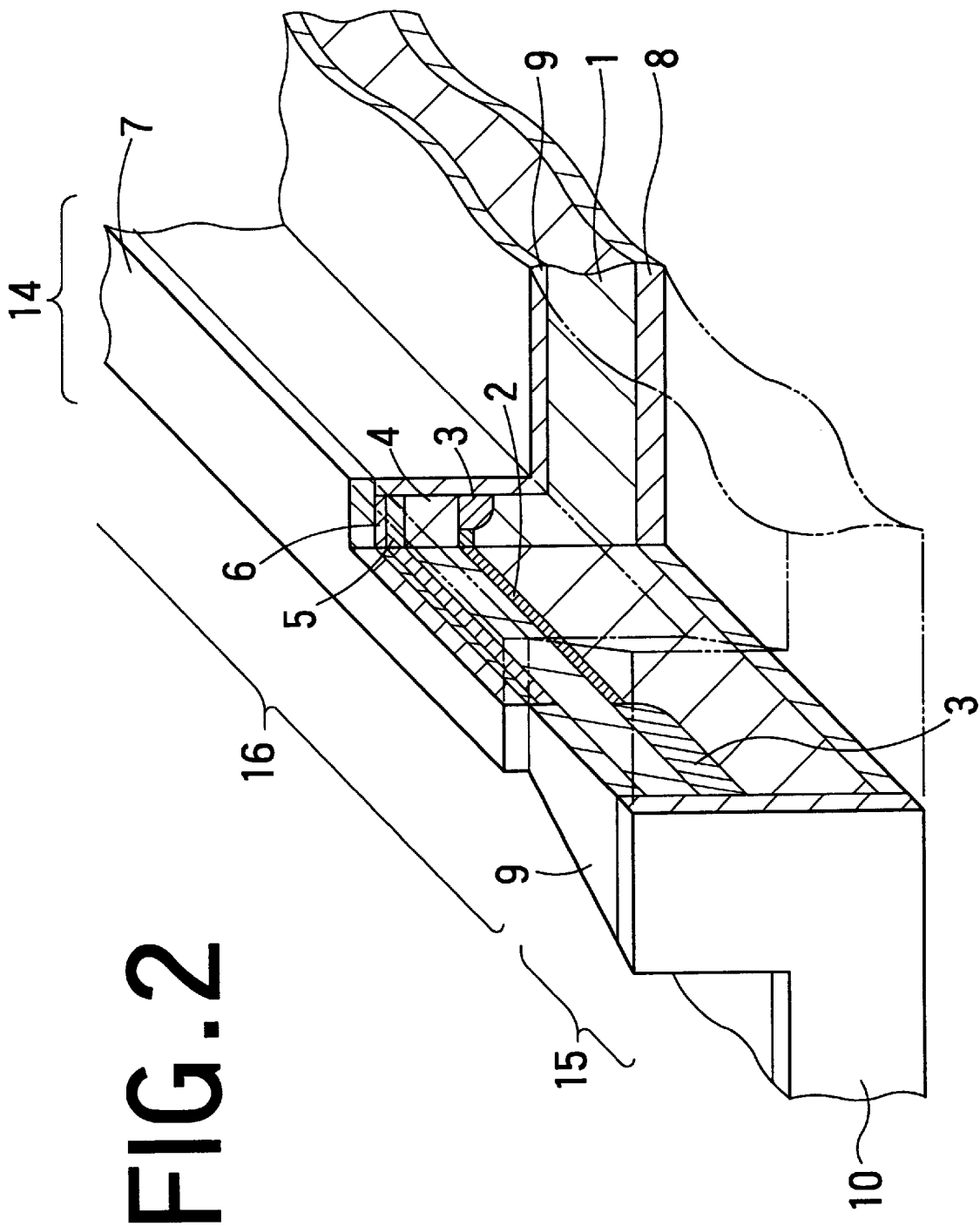
FIG. 2 is a fragmentary perspective view of the optical semiconductor device of FIG. 1, showing the part of an emission edge thereof.
Figure 3:
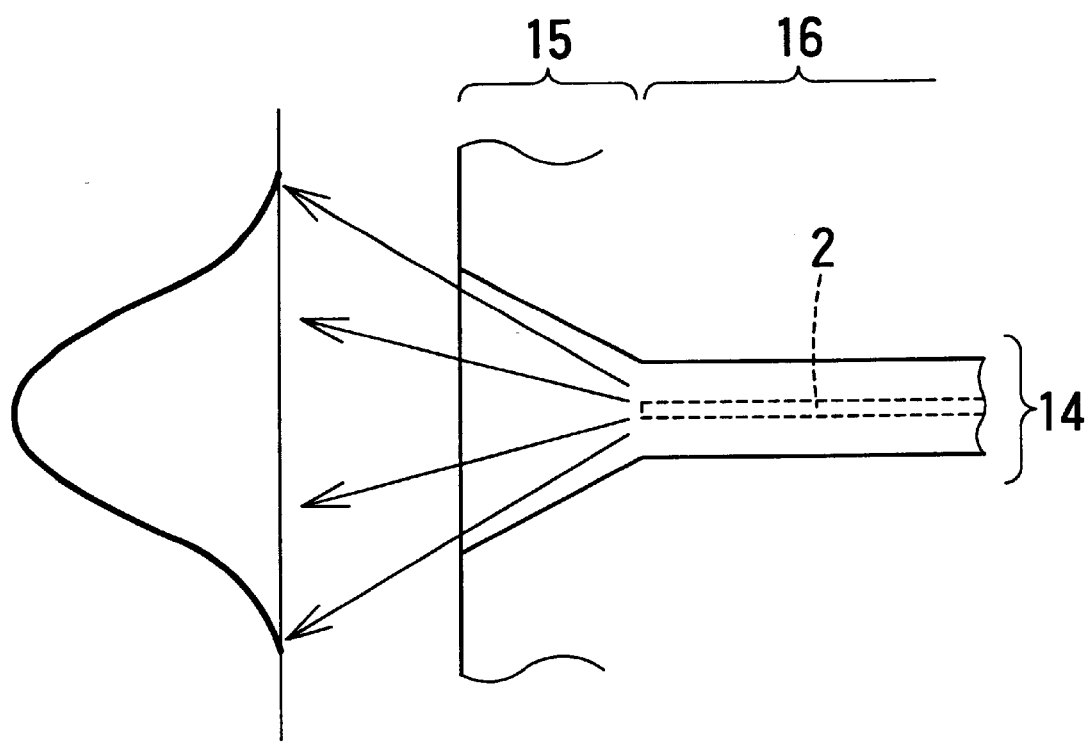
FIG. 3 is a fragmentary plan view of the optical semiconductor device of FIG. 1, showing the part of the emission edge.

In the first embodiment of the invention shown in FIG. 1 in a cross-sectional view taken along the waveguide direction of an optical semiconductor device, the device has a structure monolithically integrating a electro-absorption semiconductor optical modulator and a distributed feedback semiconductor laser. FIG. 2 shows the part of the emission edge of the optical semiconductor device of FIG. 1 in a cross-sectional view. In these drawings, numeral 1 denotes an n-type InP substrate, 2 a light absorption layer, 12 an active layer, 13 a diffraction grating, 3 a Fe-doped semi-insulating InP buried layer, 4 a p-type InP cladding layer, 5 a p-type InGaAs contact layer, 6 a Au/Zn/Au p-type ohmic electrode, 7 a Ti/Pt/Au wiring/bonding pad, 8 a AuGe/Ni/Au n-type ohmic electrode, 9 a $SiO_2$ film, 10 a $SiN_x$ low-reflective coating film, and 11 a $Si/SiO_2$ multi-layered high-reflective coating film. A modulator region 16, electrode separation region 17 and window region 15 are made to form a narrow mesa configuration by etching to reduce the parasitic capacitance. The window region 15 has the length of 15 $\mu$m, and the width of the narrow mesa 14 increases continuously from 10 $\mu$m to 25 $\mu$m toward the emission facet. A plan view of the part of the emission edge is shown in FIG. 3. In the window region 15 with no waveguide structure, light propagates while spreading out conically. However, since the width of the narrow mesa 14 increases toward the emission facet, there occurs substantially no reflection or scattering of light by side surfaces of the narrow mesa 14. Therefore, a unimodal distribution of emitted light is obtained without inviting a decrease in optical output by a scattering loss. As a result, a coupling efficiency with optical fibers was as high as 50%, and an optical output twice that by the conventional device was obtained.

(Second Embodiment)

Figure 4:
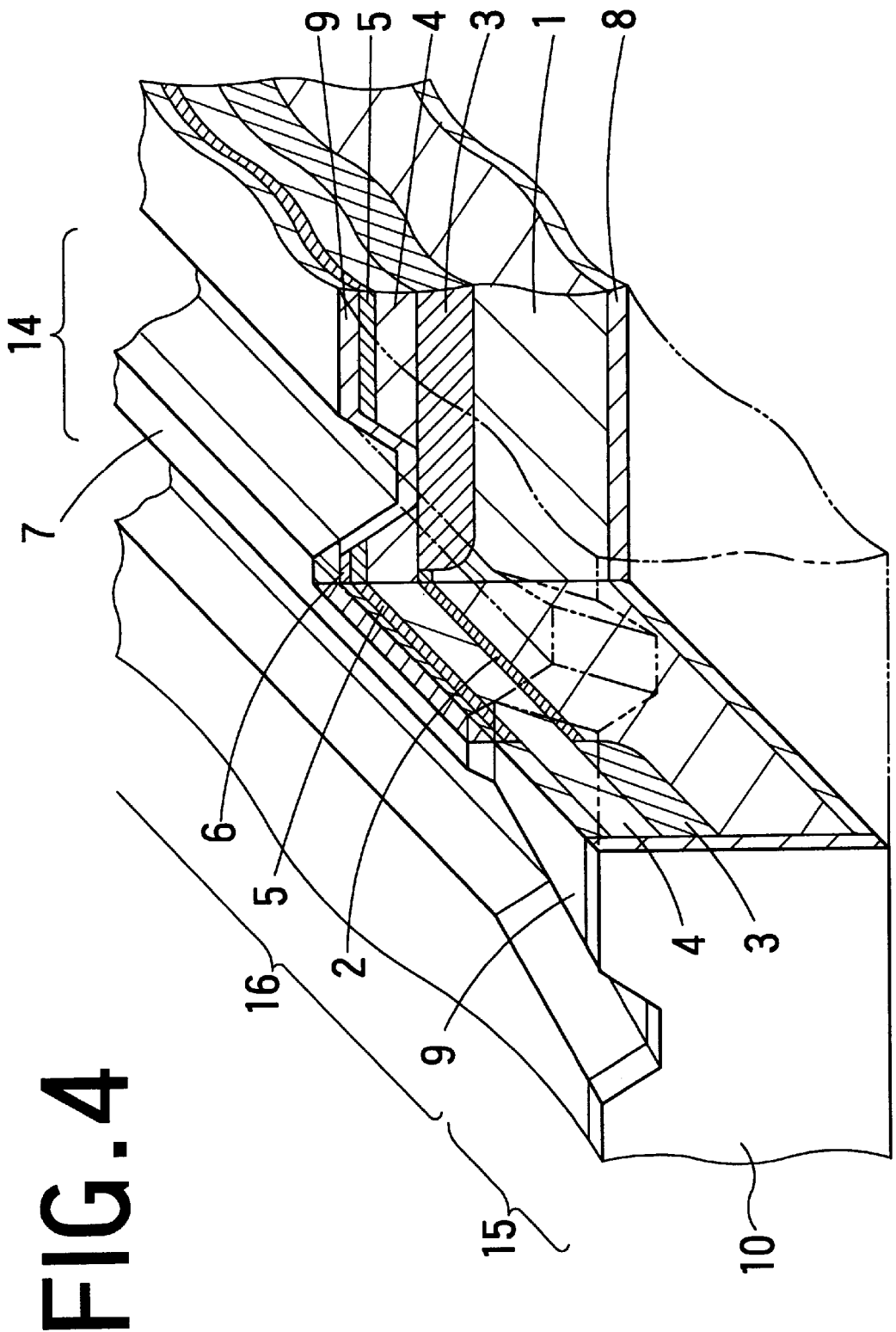
FIG. 4 is a fragmentary perspective view of an optical semiconductor device according to the second embodiment of the invention, showing the part of its emission edge.

Next explained is the second embodiment of the invention with reference to FIG. 4 which is a fragmentary perspective view of the part of the emission edge of a modulator/laser integrated light source combining a electro-absorption optical modulator and a distributed feedback semiconductor laser, taken as the second embodiment. In FIG. 4, the same or equivalent elements to those of FIG. 2 are labeled with common numerals, and omitted from explanation made below. The cross-sectional structure along the waveguide of the optical semiconductor device may be substantially the same as that of FIG. 1, and further explanation thereof is omitted here.

In this embodiment, the p-type InP cladding layer 4 (and p-type InGaAs contact layer 5) in the modulator region 16, electrode separating region 17(not shown) and window region 15 is originally formed in a narrow mesa configuration by selective growth.

Figure 5:
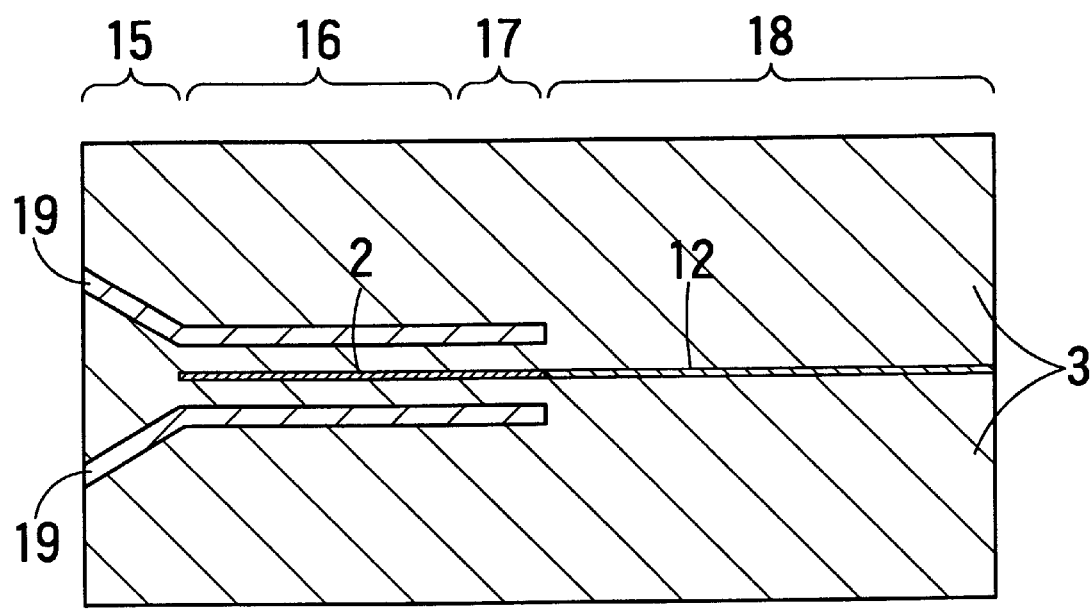
FIG. 5 is a plan view of the optical semiconductor device according to the fifth embodiment, showing the surface of a wafer before growing the cladding layers.

FIG. 5 is a plan view of the wafer surface immediately before the selective growth of the p-type InP cladding layer 4. As shown in the figure, the light absorption layer 2 and the active layer 12 are processed into a stripe configuration, and, after growing a buried layer 3 to flush the surface, masks 19 are selectively formed onto the surface. The masks 19 prevent epitaxial growth of the cladding layer 4, and may be made of $SiO_2$. Each mask 19 has the width of 3 μm, and the distance between adjacent masks 19, 19 is 10 μm. In the window region 15, however, the distance between masks 19, 19 conically increases from 10 μm to 25 μm. By selectively growing the p-type InP cladding layer 4 on the wafer selectively covered by the masks 19, 19, the narrow mesa 14 can be made. Since the width of the narrow mesa 14 in the window region 15 increases continuously toward the emission edge, a high-output operation is promised without no reflection or scattering of light by side surfaces of the narrow mesa 14.

(Third Embodiment)

Figure 6:
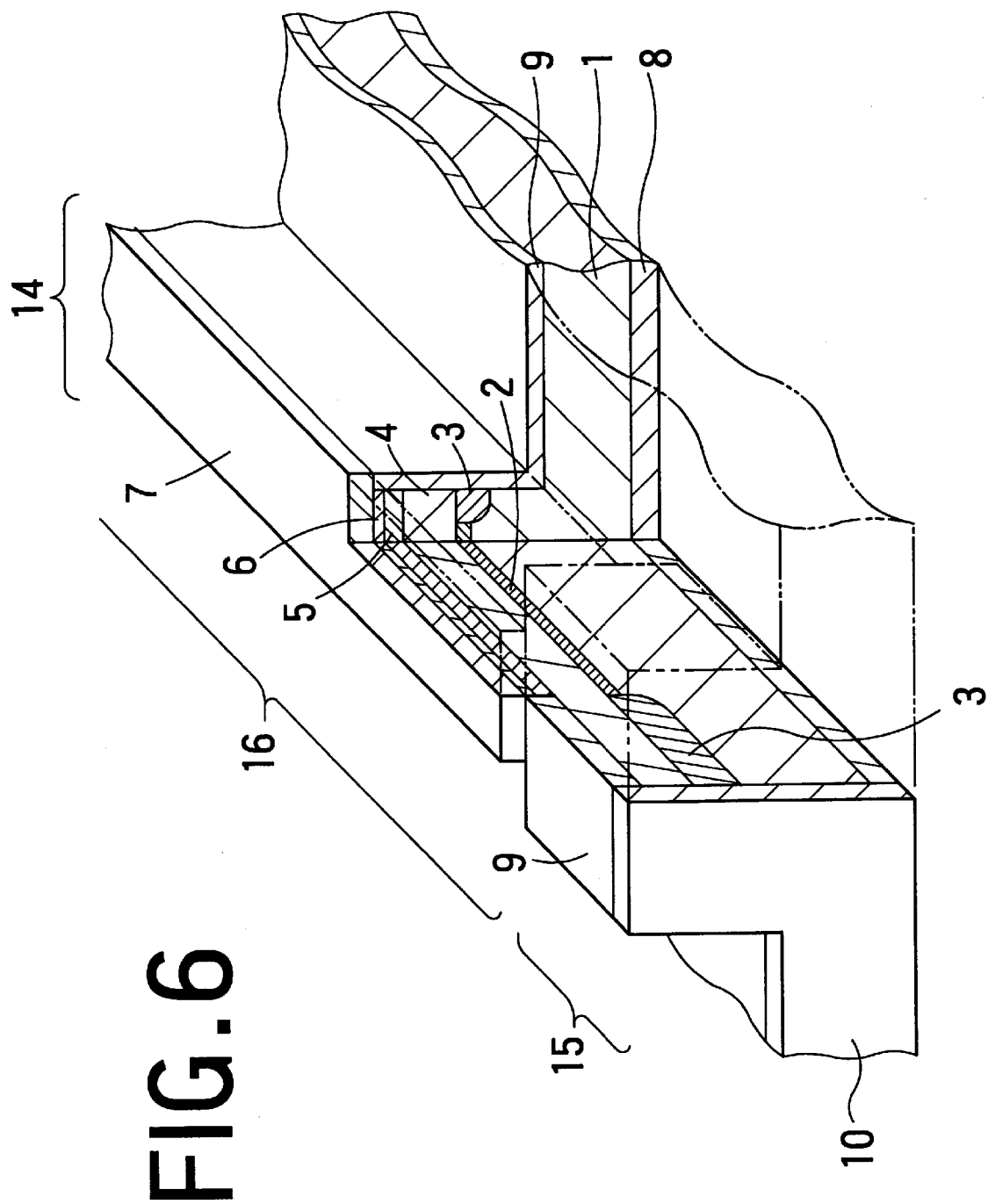
FIG. 6 is a fragmentary perspective view of an optical semiconductor device according to the third embodiment of the invention, showing the part of its emission edge.

Next explained is the third embodiment of the invention with reference to FIG. 6 which is a fragmentary perspective view of the part of the emission edge of a modulator/laser integrated light source combining a electro-absorption optical modulator and a distributed feedback semiconductor laser, taken as the third embodiment. In FIG. 6, the same or equivalent elements to those of FIG. 2 are labeled with common numerals, and omitted from explanation made below. The cross-sectional structure along the waveguide of the optical semiconductor device may be substantially the same as that of FIG. 1, and further explanation thereof is omitted here.

The modulator region 16 and the window region 15 are made in a narrow mesa configuration by etching to reduce the parasitic capacitance. The width of the narrow mesa 14 is 10 μm in the modulator region 16 and 25 μm in the window region 15. The width of the window region 15 is 15 μm.

Figure 7:
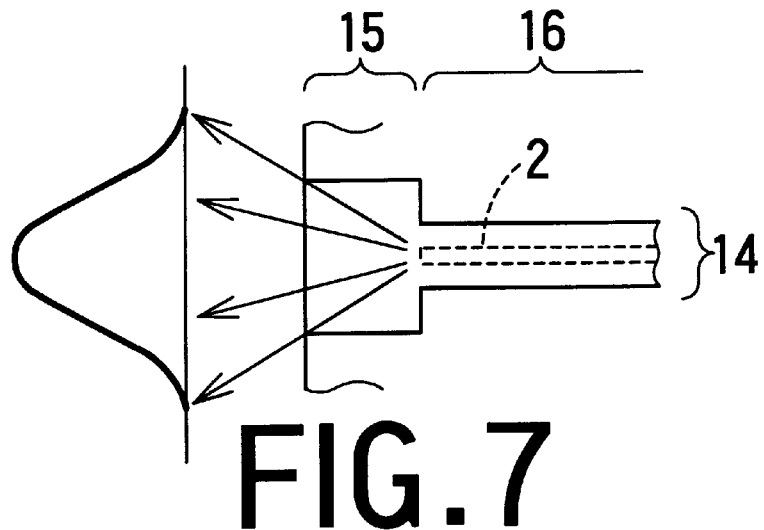
FIG. 7 is at fragmentary plan view of the optical semiconductor device of FIG. 6, showing the part of the emission edge.

FIG. 7 is a plan view of the part of the emission edge. Since the width of the narrow meas 14 in the window region 15 is as wide as 25 μm, light propagating through the window region 15 in a spread mode is not reflected or scattered by side surfaces of the narrow mesa 14 before reaching the emission facet. Therefore, a unimodal distribution of emitted light is obtained without a decrease in optical output due to a scattering loss, and the coupling efficiency with optical fibers is high.

(Fourth Embodiment)

Figure 8:
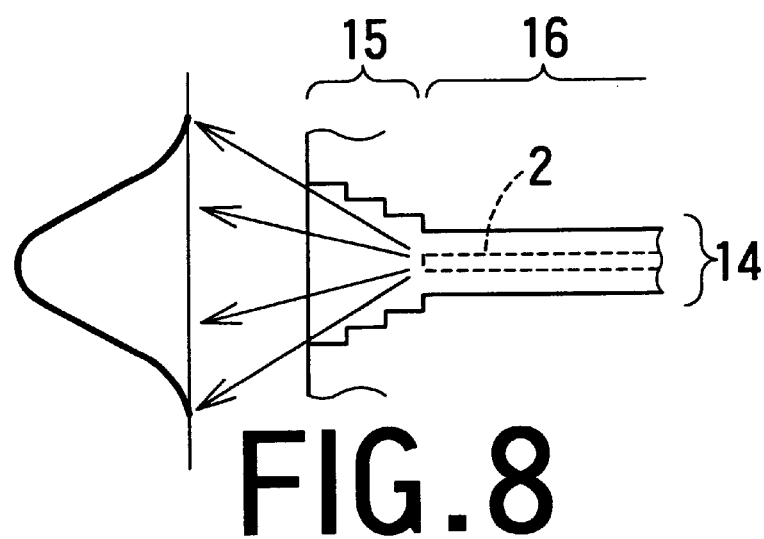
FIG. 8 is a fragmentary plan view of an optical semiconductor device according to the fourth embodiment of the invention, showing the part of the emission edge.

Next explained is the fourth embodiment of the invention with reference to FIG. 8 which is a perspective view of the part of the emission edge of a modulator/laser integrated light source combining a electro-absorption optical modulator and a distributed feedback semiconductor laser according to the fourth embodiment. In FIG. 8, the same or equivalent elements to those of FIG. 3 are labeled with common numerals, and omitted from explanation made below. The cross-sectional structure along the waveguide of the optical semiconductor device may be substantially the same as that of FIG. 1, and further explanation thereof is omitted here.

The width of the narrow mesa 14 is 10 μm in the modulator region 16. The length of the window region 15 is 15 μm, and the width of the narrow mesa 14 changes by 5 μm per 5 μm length to stepwise increase from 10 to 25 μm. As a result, reflection or scattering of light by side surfaces of the narrow mesa 14 does not occur, and a high-output operation is ensured.

(Fifth Embodiment)

Figure 9:
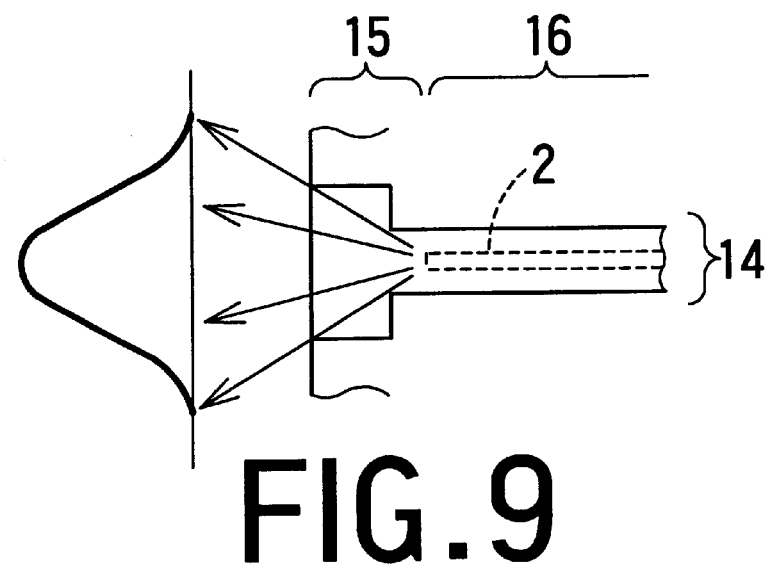
FIG. 9 is a fragmentary plan view of an optical semiconductor device according to the fifth embodiment of the invention, showing the part of its emission edge.

Next explained is the fifth embodiment of the invention with reference to FIG. 9 which is a plan view of the part of the emission edge of a modulator/laser integrated light source combining a electro-absorption optical modulator and a distributed feedback semiconductor laser, taken as the fifth embodiment. In FIG. 9, the same or equivalent elements to those of FIG. 3 are labeled with common numerals, and omitted from explanation made below. The cross-sectional structure along the waveguide of the optical semiconductor device may be substantially the same as that of FIG. 1, and further explanation thereof is omitted here.

The width of the narrow mesa 14 is 10 μm in the modulator region 16. The length of the window region 15 is 15 μm, and the width of the narrow mesa 14 is 25 μm up to the distance of 10 μm from the emission edge. That is, also in the window region 15, the narrow mesa 14 maintains the same width, 10 μm, as that in the modulator region 16 up to the distance of 5 μm beyond the end of the light absorption layer 2. However, at the position distant by 5 μm from the end of the light absorption layer 2, diffusion of light is as small as several μm. As a result, reflection or scattering of light by side surfaces of the narrow mesa 14 does not occur, and a high-output operation is ensured.

(Sixth Embodiment)

Figure 10:
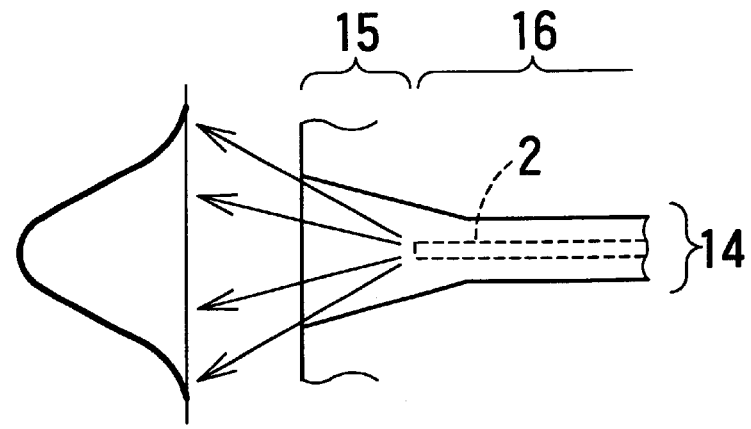
FIG. 10 is a fragmentary plan view of an optical semiconductor device according to the sixth embodiment of the invention, showing the part of the emission edge.

Next explained is the sixth embodiment of the invention with reference to FIG. 10 which is a plan view of the part of the emission edge of a modulator/laser integrated light source combining a electro-absorption optical modulator and a distributed feedback semiconductor laser, taken as the sixth embodiment. In FIG. 10, the same or equivalent elements to those of FIG. 3 are labeled with common numerals, and omitted from explanation made below. The cross-sectional structure along the waveguide of the optical semiconductor device may be substantially the same as that of FIG. 1, and further explanation thereof is omitted here.

In this embodiment, the length of the window region 15 is 15 μm, but the width of the narrow mesa 14 changes continuously from 10 μm to 25 μm over its length of 25 μm from the emission edge. That is, the narrow mesa 14 begins to increase its width within the modulation region 16. The region where the width of the narrow mesa is constant and the region where the width of the narrow mesa 14 changes are different in surface orientation of side surfaces of the narrow mesa 14. Therefore, it may be difficult to control the width of the narrow mesa 14 by etching due to a difference in rates of the side-etching between these regions. This embodiment, however, makes it easy to control the width of the narrow mesa 14 by gently changing the width.

In this embodiment, the length of the sloped region is 25 μm and longer than the length 15 μm of the window region 15. Therefore, the sloped region extends beyond the window region 15 into the modulator region 16. However, the increased width of the narrow mesa 14 in the modulator region 16 is small, and any increase of the parasitic capacitance is negligibly small and does not degrade the high-speed operation.

(Seventh Embodiment)

Figure 11:
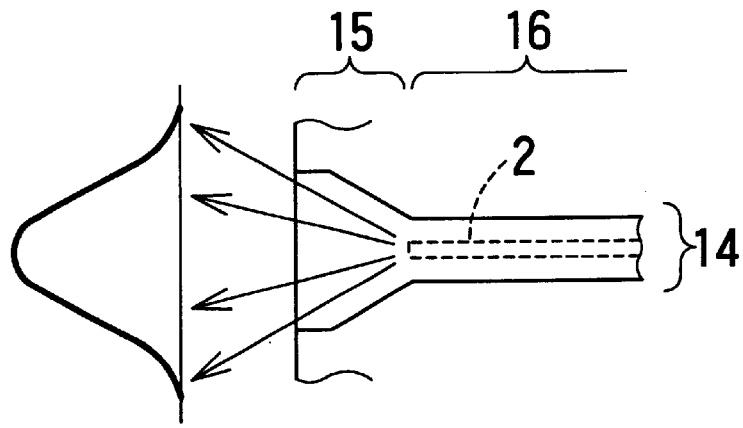
FIG. 11 is a fragmentary plan view of an optical semiconductor device according to the seventh embodiment of the invention, showing the part of the emission edge.

Next explained is the seventh embodiment of the invention with reference to FIG. 11 which is a fragmentary plan view of the part of the emission edge of a modulator/laser integrated light source combining a electro-absorption optical modulator and a distributed feedback semiconductor laser, taken as the seventh embodiment. In FIG. 11, the same or equivalent elements to those of FIG. 3 are labeled with common numerals, and omitted from explanation made below. The cross-sectional structure along the waveguide of the optical semiconductor device may be substantially the same as that of FIG. 1, and further explanation thereof is omitted here.

In this embodiment, the length of the window region 15 is 15 μm, but the width of the narrow mesa 14 changes continuously from 10 μm to 25 μm in the region starting from the 15 μm-distant position from the emission edge to the 5 μm-distant position. That is, the width of the narrow mesa is constant narrow mesa 15 is constantly 25 μm in the region up to the position distant by 5 μm from the emission facet.

Figure 12:
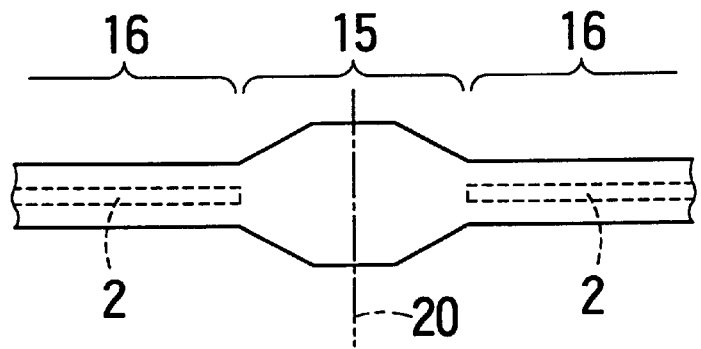
FIG. 12 is a fragmentary plan view of the optical semiconductor device according to the seventh embodiment of the invention, showing the part of the emission edge before being cleaved.

This construction copes with "positional deviation" of cleavage. Facets of an optical semiconductor device is usually formed by cleaving a semiconductor substrate. In the cleaving step, a positional deviation of approximately several μm may occur at facets. FIG. 12 is a plan view of the part of the emission edge of the optical semiconductor device of FIG. 11 before being cleaved. Before the cleaving step, two optical semiconductor devices are continuous via the window region 15. In this embodiment, since the width of the narrow mesa 14 is 25 μm near the cleaved position, the width of the narrow mesa 14 appearing at the emission facet does not decrease from 25 μm even upon the some amount of deviation of the cleaved position 20. As a result, in both optical semiconductor devices separated into two discrete devices by cleavage, the narrow mesa 14 always have the constant width of 25 μm in its length of several μm from the emission facet. That is, it is prevented that emitted light is reflected or scattered due to a decrease of the width of the narrow mesa 14 at the facet.

(Eighth Embodiment)

Figure 13:
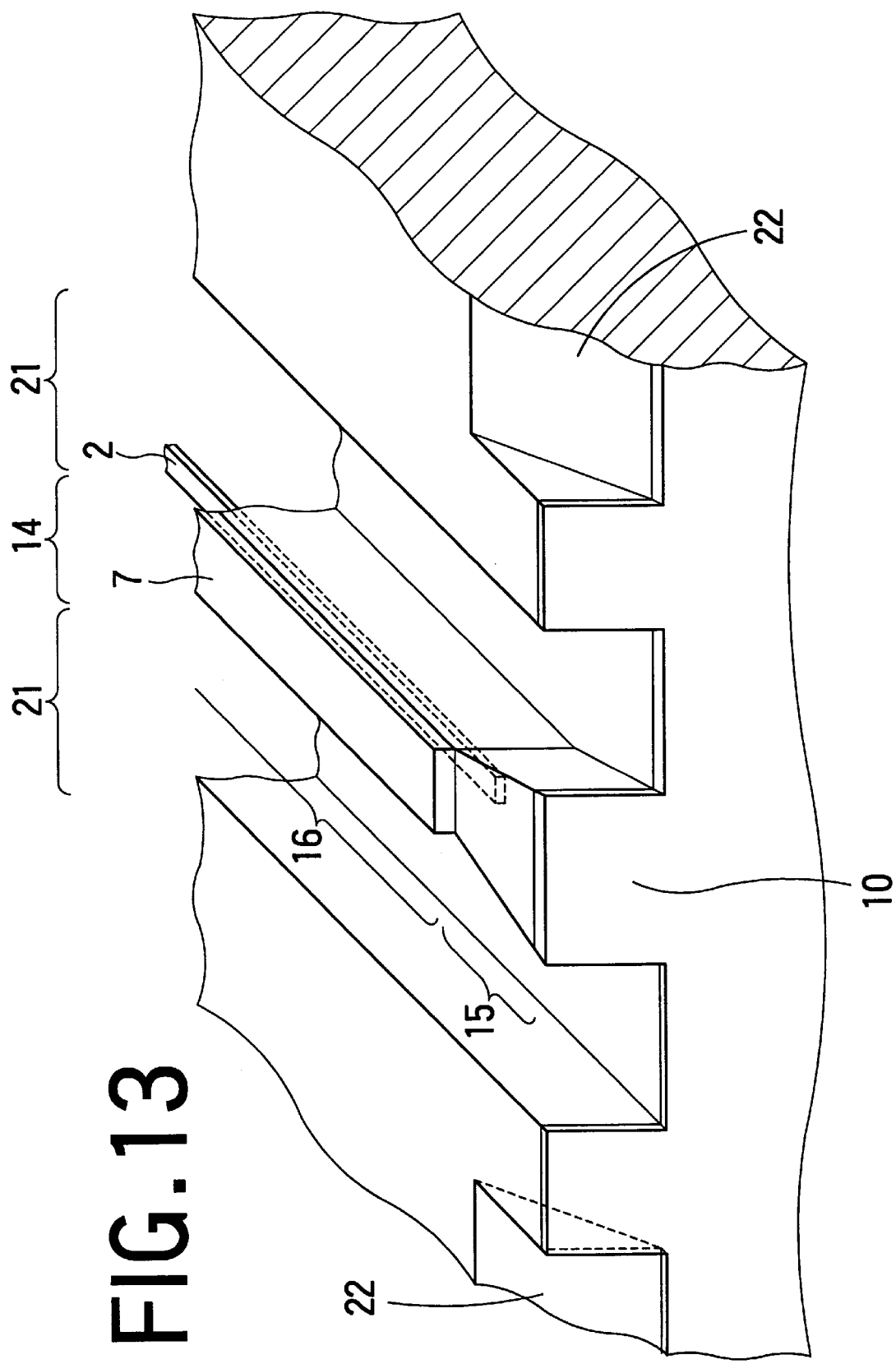
FIG. 13 is a fragmentary plan view of an optical semiconductor device according to the eighth embodiment of the invention, showing the part of the emission edge.

Next explained is the eighth embodiment of the invention with reference to FIG. 13 which is a perspective view of the part of the emission edge of a modulator/laser integrated light source combining a electro-absorption optical modulator and a distributed feedback semiconductor laser according to the eighth embodiment, taken along the waveguide direction. In FIG. 13, the same or equivalent elements to those of FIG. 3 are labeled with common numerals, and omitted from explanation made below. The cross-sectional structure along the waveguide of the optical semiconductor device may be substantially the same as that of FIG. 1, and further explanation thereof is omitted here.

In this embodiment the narrow mesa 14 is sandwiched by a pair of grooves 21, 21, and a pair of cut outs 22, 22 are made outside the grooves 21, 21.

A process for manufacturing the optical semiconductor device is explained below with reference to FIGS. 14 through 17. Using an n-type InP substrate 1 having a (100)-oriented crystallographic major surface, the light absorption layer 2 is made in the form of a stripe intermittently extending in the <110>direction. Then, the Fe-doped semi-insulating InP layer 3 is applied to cover and fill side surfaces of the light absorption layer 2 and cutout portions of the light absorption layer 2. After that, the p-type InP cladding layer and the p-type InGaAs contact layer 5 are formed in sequence on the entire surface. Then, the p-type InGaAs contact layer is selectively etched off. Using the p-type InGaAs contact layer 5 as a mask, the p-type InP cladding layer 4, semi-insulating InP buried layer 3, and n-type InP substrata 1 are etched by HCl to form the grooves 21, 21 and the cutouts 22, 22.

Figure 14:
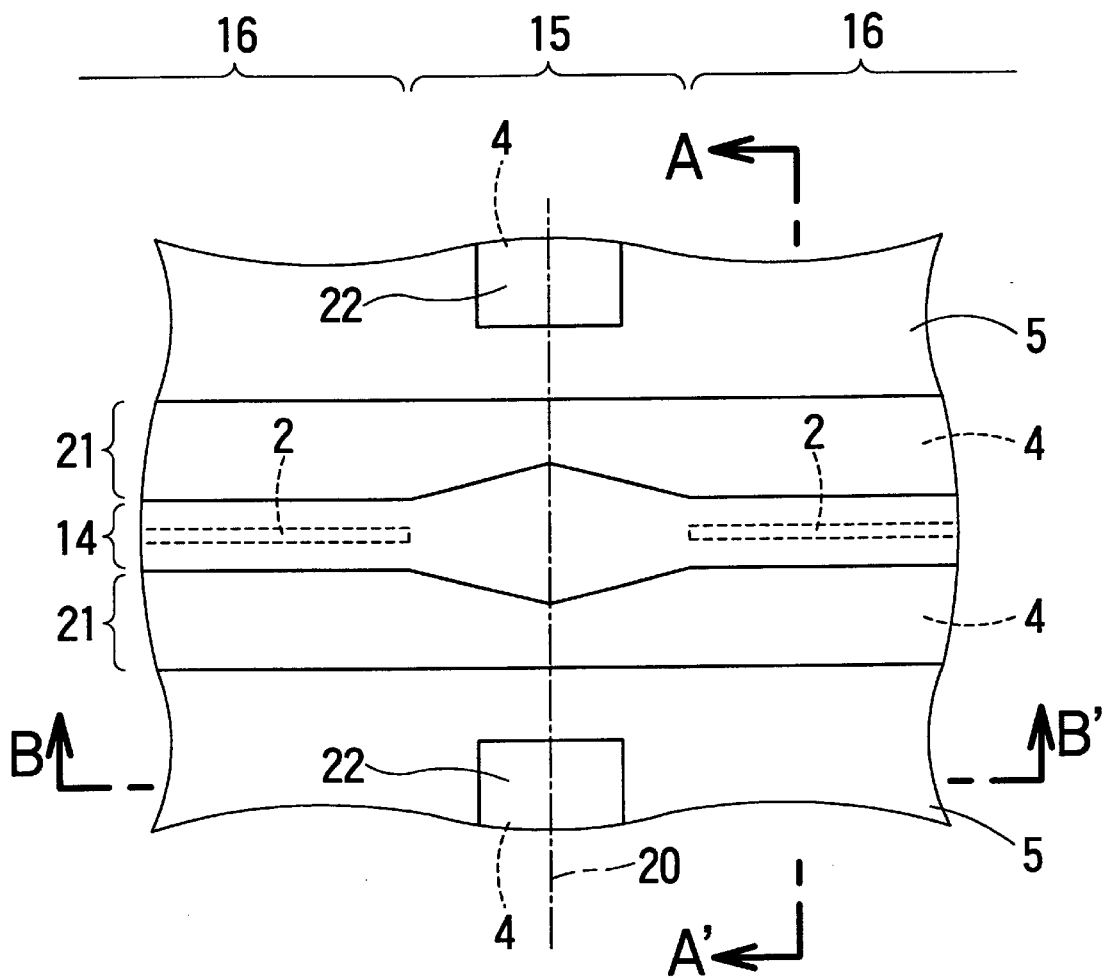
FIG. 14 is fragmentary plan view of the optical semiconductor device according to the eighth embodiment of the invention, showing the part of the emission edge before being cleaved.

FIG. 14 shows a plan view of the emission edge in the step of forming the grooves. When the InP layer is etched by HCl using the InGaAs layer 5 as a mask, side etching does not occur in the InP layer. Therefore, positions and sizes of grooves 21 and cutouts 22 can be definitely determined by patterning of the p-type InGaAs contact layer 5. That is, as shown in FIG. 14, the p-type InGaAs contact layer 5 is removed by etching in the regions of grooves 21, 21 and cutouts 22, 22.

The light absorption layer 2 is interrupted over the length of 30 μm, and the cutouts 22, 22 each having the width of 20 μm are centralized in the interrupted region of the light absorption layer 2. The width of the narrow mesa 14 sandwiched by grooves 21, 21 continuously increases from 10 μm to 25 am from the end of the light absorption layer 2 toward the center line 2Q of the cutouts 22, 22.

Figure 15:
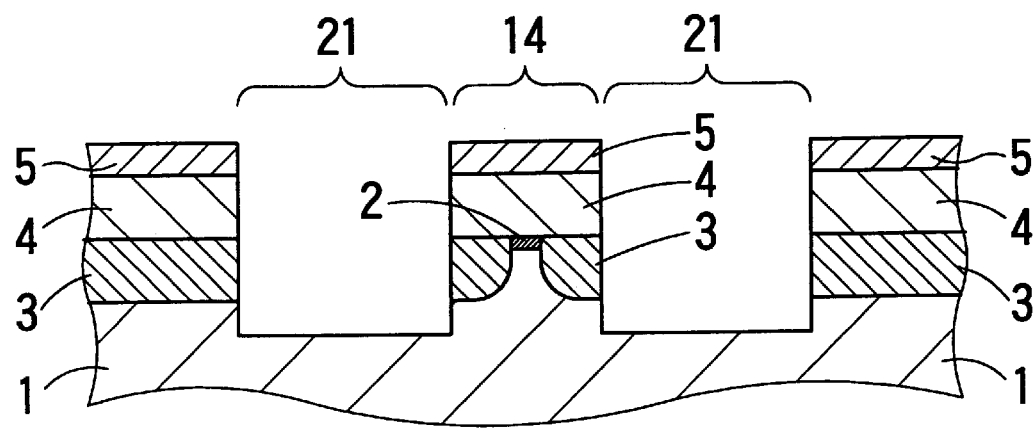
FIG. 15 is a cross-sectional view taken along the A–A' line of FIG. 14.

FIG. 15 is a cross-sectional view taken along the A–A' line of FIG. 14. In the stripe parallel to the [110] direction, side etching does not enter in the InP layer, and its side surfaces are formed substantially vertical by etching. Therefore, the position and the width of the narrow mesa 14 can be regulated precisely by the p-type InGaAs contact layer 5.

Figure 16:
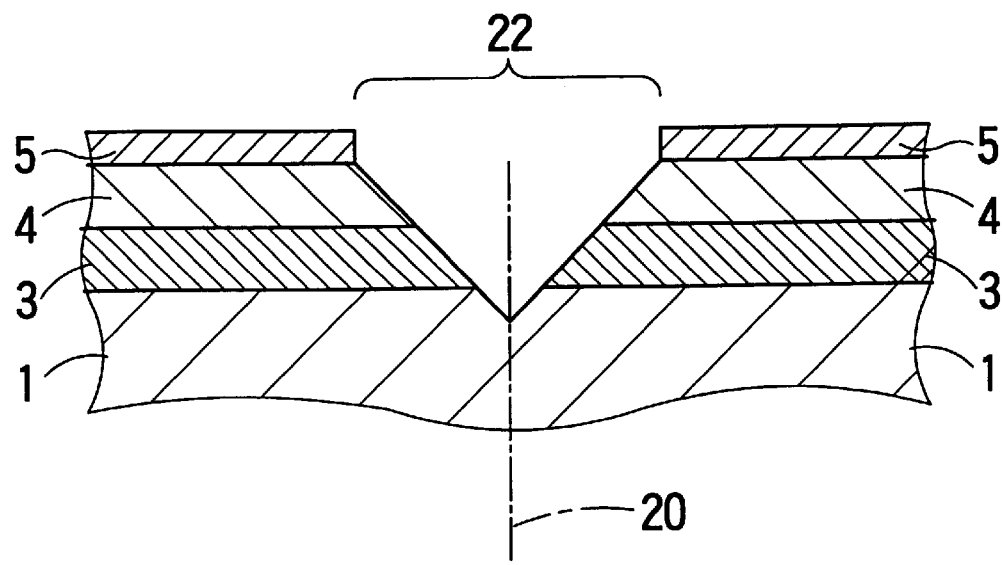
FIG. 16 is a cross-sectional view taken along the B–B' line of FIG. 14.

FIG. 16 is a cross-sectional view taken along the B–B' line of FIG. 14. In the stripe normal to the [110] direction, side surfaces of the InP layer are (111) crystallographic planes, and the cross-section of the cutout 22 is V-shaped. Moreover, since no side-etching occurs in the InP layer, the bottom of the cutout 22 is accurately aligned on the center line 20 of the aperture 22 of the p-type InGaAs contact layer 5.

After the etching process and through a step of making electrodes, the product is cleaved in the window region 15, and the cleaved edge is coated with the low-reflective film 10 made of $SiN_x$ to complete the optical semiconductor device shown in FIG. 13. In this embodiment, cleavage does not rely on scribing the wafer using a scriber, or the like, but is done by applying a stress into the cutout 22 made by etching. Since the cross-section of the cutout 22 is V-shaped as shown in FIG. 16, the product can be cleaved easily and precisely along the beveled bottom of the cutout 22, namely, the center line 20, to which the stress is centralized.

Moreover, in this embodiment, the width of the narrow mesa 14 continuously increases toward the center line 20 of the cutouts 22, 22. As a result, in each of devices made by cleavage, the width of the narrow mesa 14 continuously increases from the end of the light absorption layer 2 toward the center line 20, namely, the cleaved edge. Since the position for cleavage, namely, the center line 20, can be determined by patterning the p-type InGaAs contact layer 5, the length of the window region 15 after cleavage can be controlled with a high accuracy.

Although the foregoing example has been explained as using the p-type InGaAs constant layer 5 for etching of the InP layer upon making grooves 21 and cutouts 22, an InGaAsP layer may be used as the mask. Additionally, the InP layer may be etched independently for making grooves 21 and cutouts 22 instead of etching it simultaneously as explained in the above example. For making grooves, for example, the InP layer may be etched to a minimum extent to make the V-shaped cross-sectional configuration.

Since the side surfaces of cut out 22 are regulated by (111)-oriented surfaces and not scraped by side etching, even if the side surfaces of the cutouts 22 are exposed to HCl after the V-shaped configuration is made, the etching of the InP layer does not progress further. That is, the depth of the cutouts 22 is definitely determined by the width of the aperture of the p-type InGaAs constant layer 5. Therefore, by controlling the width of the aperture of the p-type InGaAs contact layer 5, cutouts 22 deep enough to centralize the stress for cleavage can be made easily.

Figure 17:
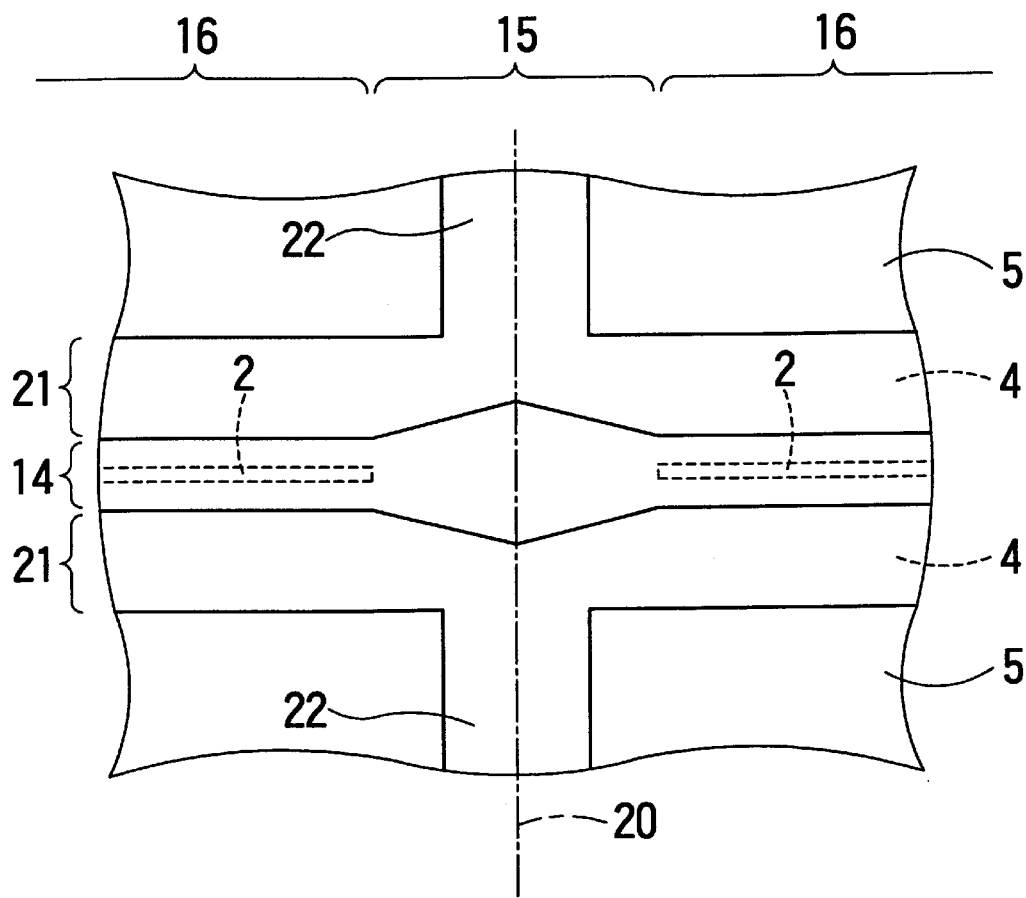
FIG. 17 is fragmentary plan view of the optical semiconductor device according to a further embodiment of the invention, showing the part of the emission edge before being cleaved.

In the above example, upon making grooves 21, the InP layer is etched down into the n-type InP substrate. However, it is sufficient to etch it off deep enough to separate the p-type cladding layer by grooves 21 for the purpose of reducing the parasitic element capacitance. Additionally, the cutouts 22 need not be isolated from the grooves 21, but may be made as a continuously combined groove 21–22, as shown in FIG. 17, by so patterning the p-type InGaAs contact layer 5 and etching the InP layer using it as a mask.

(Ninth Embodiment)

Figure 18:
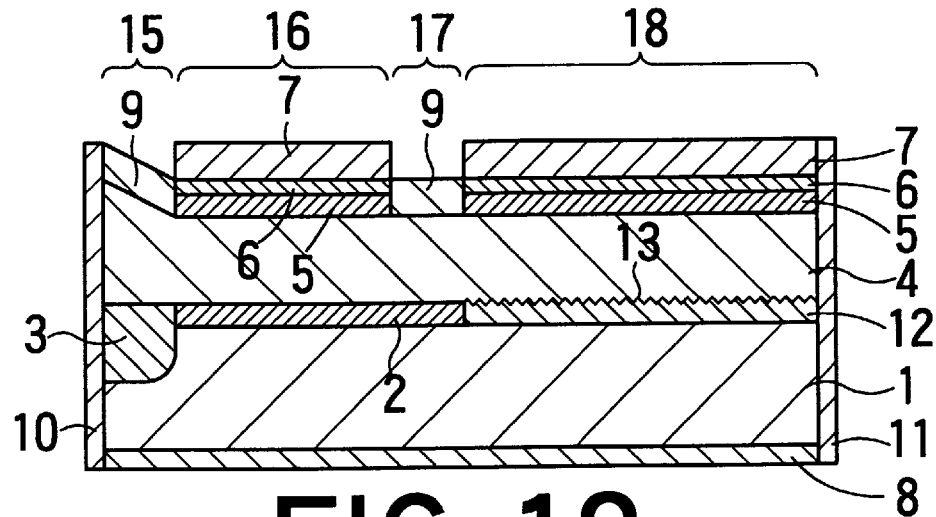
FIG. 18 is a cross-sectional view of an optical semiconductor device according to the ninth embodiment, taken along the optically guiding direction.
Figure 19:
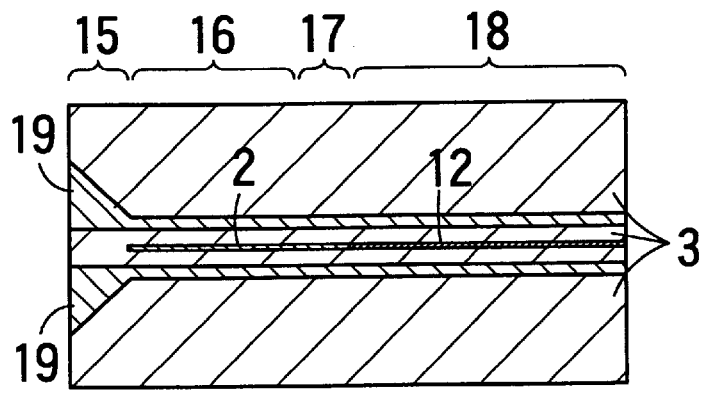
FIG. 19 is a plan view of the optical semiconductor device according to the ninth embodiment, showing the surface of a wafer before growing the cladding layers.

Next explained is the ninth embodiment of the invention with reference to FIG. 18 which is a cross-sectional view of the part of the emission edge of a modulator/laser integrated light source combining a electro-absorption optical modulator and a distributed feedback semiconductor laser according to the ninth embodiment, taken along the waveguide direction. In FIG. 18, the same or equivalent elements to those of FIG. 1 are labeled with common numerals, and omitted from explanation made below. In this embodiment, the p-type InP cladding layer 4 (and the p-type InGaAs contact layer 5) is originally made in form of a narrow mesa by selective growth. FIG. 19 is a plan view showing the wafer surface immediately before growing the p-type InP cladding layer 4. That is, the light absorption layer 2 and the active layer 12 are processes into the form of a stripe, and, after growing the buried layer 3 to flush the surface, masks 19, 19 are formed. The width of each mask 19 made of $SiO_2$ is 3 $\mu$m, and the distance between masks 19, 19 is 10 $\mu$m. In the window region 15, however, the width of each mask 19 continuously increases from 3 $\mu$m to 30 $\mu$m toward the emission edge.

When selectively growing the p-type InP cladding layer 4 on the wafer, the wider the masks 19, the larger the growth rate of the p-type InP cladding layer 4 in the region sandwiched by the masks. This is because the source material of growth supplied onto the masks 19 does not stick on the masks and migrates into the InP layer beside them. Therefore, in the window region 15, the thickness of the p-type InP cladding layer 4 continuously increases toward the emission facet. As a result, reflection or scattering of light by the upper surface of the p-type InP cladding layer 4 is small, and a highly efficient coupling with optical fibers is ensured.

Figure 20:
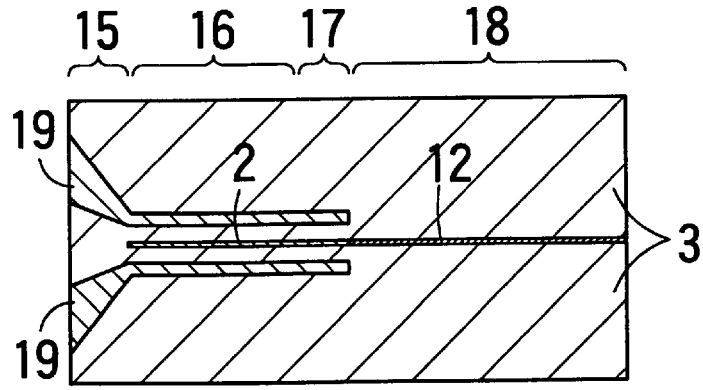
FIG. 20 is a plan view of an optical semiconductor device according to a further embodiment, showing its mask.
Figure 21:
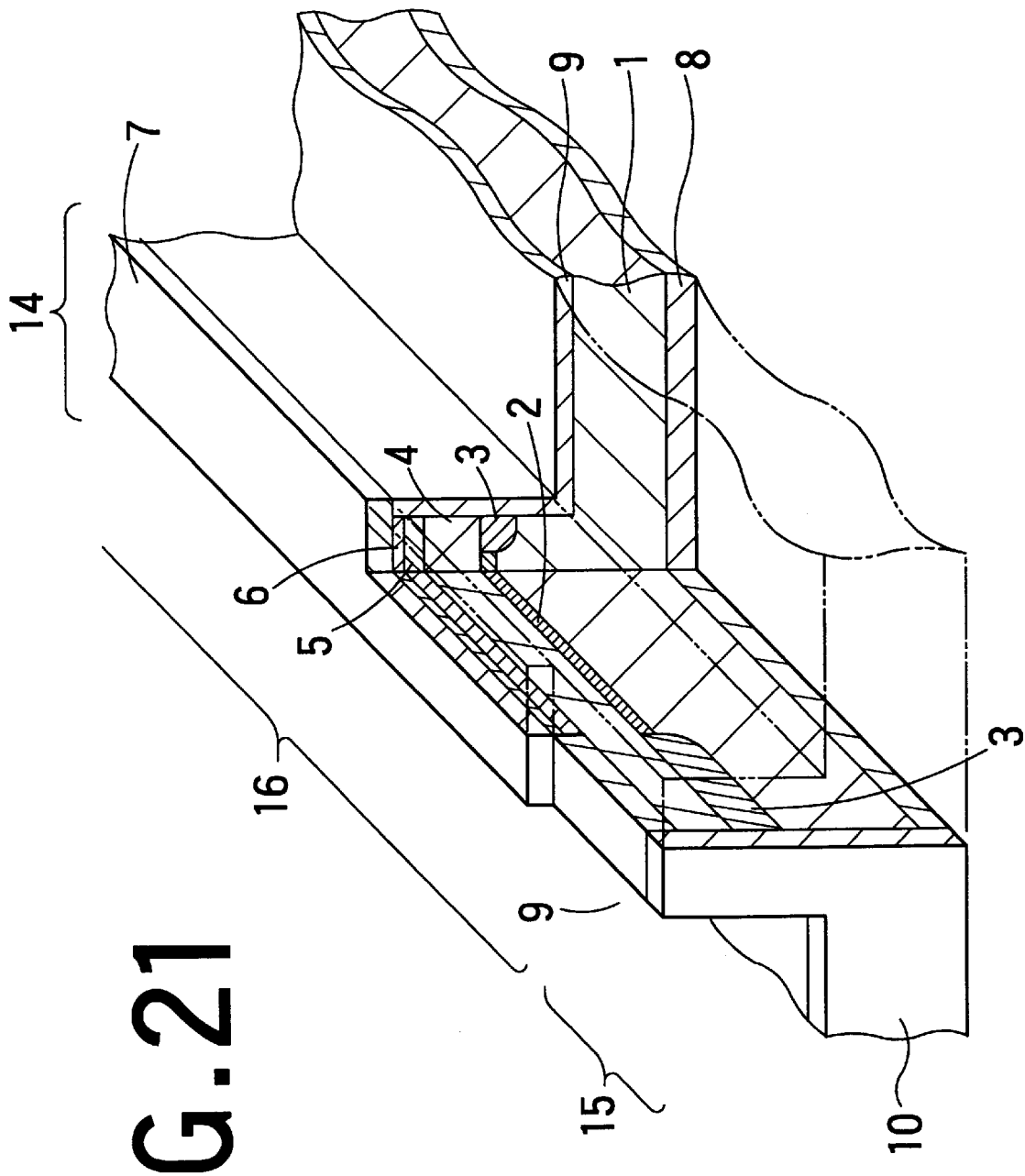
FIG. 21 is a fragmentary perspective view of a conventional optical semiconductor device, showing the part of its emission edge.
Figure 22:
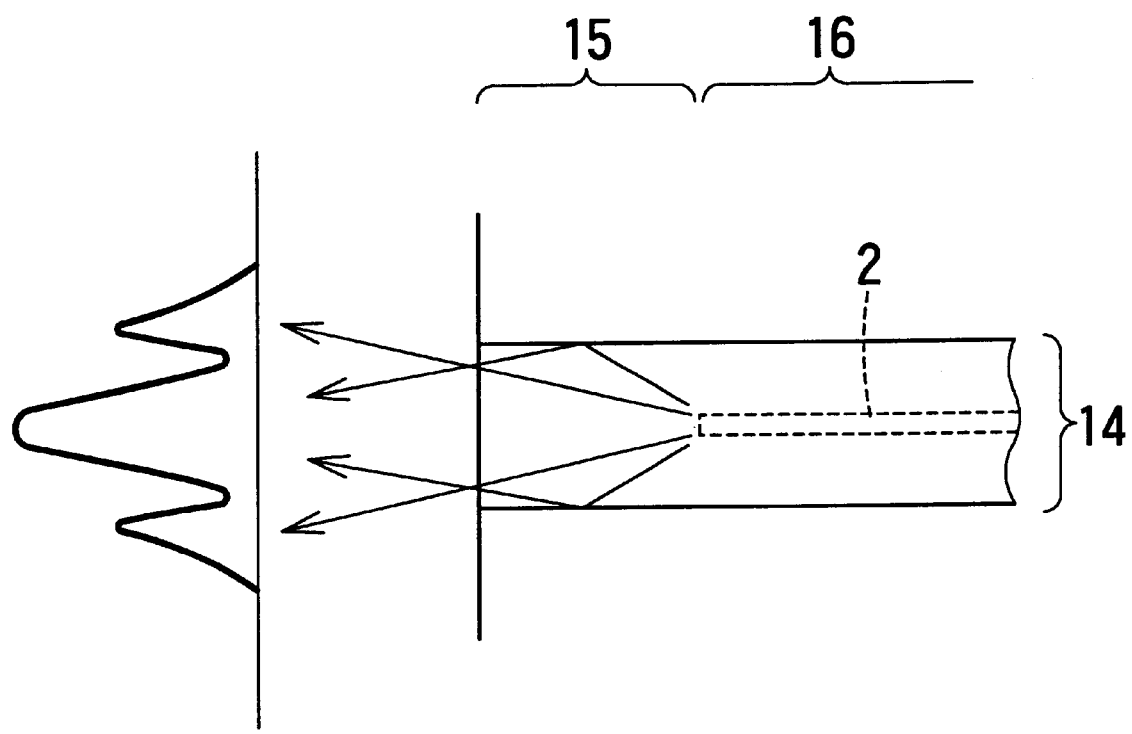
FIG. 22 is a fragmentary plan view of the conventional optical semiconductor device, showing the part of the emission edge.

The foregoing example has been explained as the p-type InP cladding layer 4 being continuously increased only in thickness; however, it may be continuously increased in both width and thickness simultaneously by selectively growing the p-type InP cladding layer 4 using masks 19, 19 configured as shown in FIG. 20, for example. As a result, reflection or scattering of emitted light can be prevented both in the width direction and in thickness direction to further improve the coupling efficiency with optical fibers and to ensure a higher optical output.

The invention is not restricted to embodiments shown above. For example, the embodiments have been explained as changing the width or thickness of the narrow mesa in a continuous, stepwise, rectangular or other form; however, it may be changed to draw a curve or in a form combining these lines. Also, the invention is applicable not only to InGaAsP optical semiconductor devices but alto to devices using other various materials such as AlGaAs or AlGaInP. Additionally, the invention is effective also when applied to independent semiconductor lasers, optical modulators, optical amplifiers, optical switches, optical couplers, optical waveguides, or their integrated device structures other than the monolithically integrated structure of the optical modulator and the semiconductor laser as explained with the embodiments.

Moreover, the light absorption layer and the active layer may be made either of a bulk material or of a multi-quantum well structure. Further, the semiconductor buried layer is not limited to the InP layer, and any appropriate semiconductor layer, such as InGaAsP layer, or a multi-layered InP/InGaAsP layer, may be used.

Also for the conduction types of the semiconductor substrate and the semiconductor buried layer, various semiconductor layers may be used. In these and other respects, the invention may be used in various modified forms without departing from the scope and concept thereof.

According to the invention, the window structure made by partly removing the optical guide layer near the emission edge decreases the facet reflectivity, and the narrow-mesa cladding layer including the window region reduces the parasitic capacitance. Therefore, a high-speed modulation of the device is ensured. Moreover, since the cladding layer in the window region is formed to change its width or thickness in accordance with the dispersion angle of light which spreads out conically while propagating from the end of guide layer toward the emission edge. Thus, the invention can prevent reflection and scattering of light by the side surface of the cladding layer, and hence prevents a decrease of optical output caused by a scattering loss and a turbulence of the distribution of emitted light. As a result, an optical semiconductor device having a high coupling efficiency with optical fibers and a high output can be realized.

What is claimed is:

1. An optical semiconductor device including a stripe-shaped optical guide layer, and a cladding layer stacked on the optical guide layer and having a narrow mesa structure containing the optical guide layer, comprising:

an end of said optical guide layer being set back from an emission facet from which light is emitted; and said cladding layer being changed in at least one of the width and the thickness thereof along an optical guide direction at a region between said end of said optical guide and said emission facet.

2. The optical semiconductor device according to claim 1, wherein said cladding layer is wider at said emission facet than around said optical guide layer.

3. The optical semiconductor device according to claim 1, wherein said cladding layer is thicker at said emission facet than around said optical guide layer.

4. The optical semiconductor device according to claim 2, wherein said cladding layer has a width distribution which follows the spread angle of light emitted from said end of the optical guide layer toward said emission facet.

5. The optical semiconductor device according to claim 3, wherein said cladding layer has a thickness distribution which follows the spread angle of light emitted from said end of said optical guide layer toward said emission facet.

6. The optical semiconductor device according to claim 1, wherein said cladding layer changes in width or thickness stepwise toward said emission facet.

7. The optical semiconductor device according to claim 1, wherein said optical semiconductor device is integrated together with another optical semiconductor device on a common semiconductor substrate.

8. An optical semiconductor device including a stripe-shaped optical guide layer, and a cladding layer stacked on the optical guide layer and having a narrow mesa structure containing the optical guide layer, comprising:

an end of said optical guide layer being set back from an emission facet from which light is emitted; and said cladding layer being changed continuously in at least one of the width and the thickness thereof along an optical guide direction at a region between said end of said optical guide and said emission facet in accordance with the spread angle of light emitted from said end of said optical guide layer toward said emission facet, and being constant in the width and the thickness thereof at said emission facet.

9. An optical semiconductor device including a stripe-shaped optical guide layer, and a cladding layer stacked on the optical guide layer and having a narrow mesa structure containing the optical guide layer, comprising:

an end of said optical guide layer being set back from an emission facet from which light is emitted;

said cladding layer being changed in at least one of the width and the thickness thereof along an optical guide direction at a region between said end of said optical guide and said emission facet; and a cutout formed along said emission facet in a region other than the location of said narrow mesa-shaped cladding layer.

10. The optical semiconductor device according to claim 9, wherein said cutout is configured so that said optical semiconductor device becomes thinner toward said emission facet.

11. The optical semiconductor device according to claim 9, wherein said cutout is formed along each side of said cladding layer.

12. An optical semiconductor device including a stripe-shaped optical guide layer, and a cladding layer stacked on the optical guide layer and having a narrow mesa structure containing the optical guide layer, comprising:

an end of said optical guide layer being set back from an emission facet from which light is emitted; and said cladding layer being changed continuously in at least one of the width and the thickness thereof along an optical guide direction at a region between said end of said optical guide and said emission facet in accordance with the spread angle of light emitted from said end of said optical guide layer toward said emission facet.

* * * * *